(12) United States Patent
Bublitz et al.

(10) Patent No.: US 12,189,154 B2
(45) Date of Patent: Jan. 7, 2025

(54) OPTICAL SYSTEM WITH A FILTER ELEMENT

(71) Applicant: Carl Zeiss Jena GmbH, Jena (DE)

(72) Inventors: Daniel Bublitz, Rausdorf (DE); Matthias Hillenbrand, Jena (DE); Matthias Burkhardt, Eichenberg (DE)

(73) Assignee: Carl Zeiss Jena GmbH, Jena (DE)

( * ) Notice: Subject to any disclaimer, the term of this patent is extended or adjusted under 35 U.S.C. 154(b) by 480 days.

(21) Appl. No.: 17/619,570

(22) PCT Filed: Jun. 15, 2020

(86) PCT No.: PCT/EP2020/066480
§ 371 (c)(1),
(2) Date: Dec. 15, 2021

(87) PCT Pub. No.: WO2020/254244
PCT Pub. Date: Dec. 24, 2020

(65) Prior Publication Data
US 2022/0381961 A1    Dec. 1, 2022

(30) Foreign Application Priority Data

Jun. 18, 2019 (DE) .......................... 102019116514.8
Feb. 17, 2020 (DE) .......................... 102020104036.9

(51) Int. Cl.
*G02B 5/26*    (2006.01)
*G02B 5/20*    (2006.01)
*G02B 27/28*   (2006.01)

(52) U.S. Cl.
CPC ............. *G02B 5/26* (2013.01); *G02B 5/203* (2013.01); *G02B 27/283* (2013.01)

(58) Field of Classification Search
CPC ................................. G02B 5/26; G02B 27/283
(Continued)

(56) References Cited

U.S. PATENT DOCUMENTS

| 4,184,749 A * | 1/1980 | Grossman .............. G02B 13/00 |
| | | 356/416 |
| 2010/0171951 A1* | 7/2010 | Misra ........................ G01J 3/10 |
| | | 356/301 |

(Continued)

FOREIGN PATENT DOCUMENTS

WO    2008140787 A2    11/2008

OTHER PUBLICATIONS

Pradyumna K. Swain et al.: "Curved CCDs and their application with astronomical telescopes and stereo panoramic cameras", Proc. SPIE 5301, Sensors and Camera Systems for Scientific, Industrial, and Digital Photography Applications V, Jun. 7, 2004, 22 pages.

(Continued)

*Primary Examiner* — Jerry L Brooks
(74) *Attorney, Agent, or Firm* — Skaar Ulbrich Macari, P.A.

(57) ABSTRACT

An optical system with an entrance pupil, has a first aperture diameter, an exit pupil and a reflective or transmissive filter element spaced at a distance from the entrance pupil, which is designed and arranged such that a second diameter is illuminated on the filter element by a beam passing through the entrance pupil and spreading divergently from this. The second diameter corresponds to n times the first aperture diameter, and n is a number greater than 1, as a result of which the local angular spectrum at each point on the filter element is n times smaller in comparison to the entrance pupil. The filter element selectively reflects or transmits to the exit pupil at each point only a predetermined spectral range. An optical imaging unit comprising the filter element is provided, which images the entrance pupil onto the exit pupil.

20 Claims, 8 Drawing Sheets (58) Field of Classification Search
USPC .......................................................... 359/618
See application file for complete search history.

(56) References Cited

U.S. PATENT DOCUMENTS

2010/0301218 A1* 12/2010 Ayer ......................... G01J 3/12
250/353
2013/0148195 A1  6/2013 Achal

OTHER PUBLICATIONS

International Preliminary Report on Patentability rendered by the International Bureau of WIPO for PCT/EP2020/066480, dated Dec. 21, 2021, 10 pages.

* cited by examiner

OPTICAL SYSTEM WITH A FILTER ELEMENT

PRIORITY

This application claims the priority of German patent application DE 10 2019 116 514.8 filed Jun. 18, 2019 and to the German patent application DE 10 2020 104 036.9 filed Feb. 17, 2020, both of which are hereby incorporated herein by reference in their entirety.

FIELD

The present invention relates an optical system comprising a filter element which is suitable, in particular, as a narrow bandwidth spectral filter for camera systems with a large etendue.

BACKGROUND

By way of example, such camera systems can be used to measure the distances of objects in the surroundings of a vehicle with an active illumination.

What is known as a time-of-flight technique can be used in this case, wherein a light source is modulated in the range of 10-40 MHz in terms of its brightness and the phase angle of the light reflected by the object is evaluated in relation to the modulation phase. The method can be implemented both in point-scanning fashion and using a spatially resolved camera, in which each individual pixel realizes such a phase evaluation. It is difficult to use the method if the ambient light intensities are too high. Currently, the corresponding camera sensors with electronic DC light suppression and a dichroic detection filter with a bandwidth of approximately 50 nm attain an effective range of approximately 40 m. However, a range in the region of 100 to 200 m would be required for autonomously driving automobiles. A further disadvantage of the method lies in the susceptibility to errors as a result of interactions with systems from other automobiles.

Further, the practice of carrying out a distance measurement using point projection and camera (triangulation) is known, wherein a collimated laser beam is converted with the aid of a phase element such that it emits an asymmetric 2-D point pattern with approximately 100×100 points into the image field to be detected. Then, the absolute positions of the points in the image can be evaluated on a camera sensor whose pupil is at a certain distance from the point illumination pupil. If the base length (distance between the illumination and detection pupil) is known, the distance at the illuminated object can be triangulated for every point in this way. An advantage of the method is that it is simple to realize from a technical point of view. Moreover, it is not necessary to actively illuminate the entire image field, but the illumination intensity is only divided among the relatively few points instead. This can significantly reduce the overall power consumption. However, the effective ambient light suppression and hence the effective range tends to be less than in the case of the time-of-flight technique since temporal signal filtering is not as effective and the maximum possible illumination intensities are restricted by light limits, which are therefore very similar for both methods. The method is already used as a standard in games consoles and cellular telephones for the purposes of measuring the near region (a few m). The system needs to be equipped with two cameras when used in an automobile in order to prevent interference by other such systems in traffic. The relative positions of the points in the two camera images to one another are evaluated in that case. Hence, the method is independent of the coordinates of the source pupil and it is also possible to evaluate picture elements projected by other automobiles or road users.

However, the central difficulty in the case of these systems is that there is too little suppression of the ambient light. Better spectral filtering would have to be carried out. However, this is not readily possible for the detection on account of the high detection etendue.

By way of example, if the intention is to filter a 900 nm source with a bandwidth of 1 nm, the angle of incidence must be located in the region of ±2.7° in the case of perpendicular incidence.

If attempts are made to retrofit a camera with an objective with such a filter in the pupil plane, the image field is reduced to approximately 5° or a filter width of 50 nm is obtained for typical image fields of 40°, which corresponds to the prior art.

If the filter is brought close to the sensor plane, the angle range corresponds to a maximum f-number of 1/10.6. Typical f-numbers sought after for this application are in the region of typical cellular telephone objectives of approximately 1/1.5 . . . 1/2.4.

It is for these reasons that there is no position in the system of a camera with a f-number of approximately 1/1.5 and an image field of 40-100° where 1 nm wide spectral filtering can be realized.

SUMMARY

It is an object of certain embodiments of the invention to provide an optical system which can be used to realize very narrow bandwidth filtering with a high etendue.

The number n can be, in particular, a number that is greater than 2, greater than 5, greater than 10, greater than 20, greater than 30 and preferably less than 1000 or less than 100.

The reflective or transmissive filter element can have a one-part or multi-part embodiment. If the reflective or transmissive filter element has a multi-part embodiment, the plurality of parts can be arranged in one optical arm or in, e.g., two optical arms. If they are arranged in two optical arms, at least one reflective or transmissive portion of the filter element is preferably arranged in each optical arm. The generation of two arms can be realized by means of polarization splitting and/or intensity splitting. A corresponding splitter plate or corresponding splitter cube, for example, can be provided to this end.

If the reflective or transmissive filter element comprises a plurality of parts, the individual parts can be spaced apart from one another by an air gap. Further, the reflective filter element may comprise a stepped mirror. By way of example, the transmissive filter element can comprise a transmissive Fabry-Perot element.

The reflective or transmissive filter element can comprise a plane reflective side or surface. Further, the reflective or transmissive filter element might have a curved reflective side or surface.

The imaging optical unit can be designed such that intermediate imaging is realized, or a real intermediate image is generated, on the reflective or transmissive filter element. The real intermediate image can be generated between entrance pupil and filter element or between the filter element and the exit pupil. Preferably, the intermediate image is closer to the filter element than to the entry pupil or to the exit pupil. The distance between the intermediate image and the filter element can be, e.g., less than 50%, 40%, 30%, 20%, 10% or 5% of the distance between the filter element and the entrance pupil (if the intermediate image is generated between entrance pupil and filter element) or the exit pupil (if the intermediate image is generated between filter element and exit pupil).

The imaging optical unit may comprise only the filter element as an imaging element. The imaging optical unit may include possibly provided deflection mirrors, which only bring about a deflection since the deflection mirrors preferably have a planar embodiment. Since such deflection mirrors have no imaging effect, such an imaging optical unit is still understood in this case to be an imaging optical unit which (with the exception of possibly provided deflection mirrors) only comprises the filter element.

Alternatively, it is possible for such an imaging optical unit to comprise at least one further imaging element (such as a lens, a curved mirror, an imaging grating, for example).

The optical system can be designed such that the entrance and exit pupil partly or completely overlap. By way of example, a complete overlap can be a request by means of intensity or polarization splitting. A corresponding splitter plate or a corresponding splitter cube, for example, can be provided to this end.

The optical system can be designed such that the reflective filter element is designed as a retroreflector and consequently reflects beams propagating divergently from the entrance pupil back onto themselves. However, it is also possible for a certain angle to be present between the beam incident on the reflective filter element and the beam reflected by the reflective filter element. The angle is preferably less than 20°, 15°, 10° or 5°.

The imaging optical unit can be designed such that it brings about homogenization. In particular, a homogenization can be generated in the field and/or in an aperture.

By way of example, the optical system according to certain embodiments of the invention can be in the form of a camera, spectrometer or switchable light source. To this end, the optical system according to certain embodiments of the invention can comprise further elements, known to a person skilled in the art, for realizing the corresponding functions of a camera, a spectrometer or a switchable light source.

The optical system according to certain embodiments of the invention can be designed such that, for example, a filter width of 1 nm or less is present for a predetermined wavelength (e.g., from the VIS or NIR range) in the case of an image field of, for example, at least 30°, 40° or 50° or in the case of an image field ranging from 30° to 120°.

Essential principles of the optical system according to certain embodiments of the invention with a filter element can be represented as outlined below.

A conventional spectral filter consisting of dielectric layers, for example, is substantially determined in terms of its spectral resolution by, firstly, its layer design and, secondly, by the use in an optical arrangement with a certain angle spectrum. Both design elements are independent and limit the spectral resolution, and so a filter can have a very narrow bandwidth configuration only if it comprises a suitable layer design with many very precisely ablated layers and, secondly, if it is suitably integrated in the optical system.

This invention relates, in particular, to a novel design of the filter element according to certain embodiments of the invention in combination with the integration in the optical structure of an optical system such that a spectral resolution limit (referred to as conventional resolution limit below) can be undershot, said spectral resolution limit not being able to be undershot in the case of a conventional filter element with a conventional arrangement in an optical system, even with a perfect layer design of the conventional filter element.

In order to derive this conventional resolution limit, the assumption is made below that an axially structured filter element without lateral structuring is passed through by a light ray at an angle of incidence of $\alpha$. In this case, an axially structured filter element is understood to mean, in particular, a filter element which is structured in the direction of a light ray incident perpendicular thereon (if used as intended).

The number of layers of the conventional filter element and the specific spacings of the layers are irrelevant for the following derivation. As a result of the symmetry of the system, the conventional filter element only sees the projection of the light wave on its grating vector. Specifically, it only sees the composite variable $G=\lambda/\cos(\alpha)$. Hence, as a result, an only axially structured conventional filter element is not able, as a matter of principle, to distinguish between a change in the cosine of the angle of incidence $\alpha$ and a change in the wavelength $\lambda$. Therefore, independently of the quality of the layer design, a conventional filter element is unable to realize very narrow bandwidth filtering for a broad angle of incidence spectrum. An angle of incidence spectrum of for example ±20° about a mean angle of incidence of 0° generates, for example, a complete transmission for a design wavelength of 800 nm) (G(0°)=800 nm) for a ray with perpendicular incidence while, for the marginal rays at an angle of 20°, $$G(0°)\cos(20°)=752 \text{ nm}$$

specifies the position of the transmission. Hence, it is possible to attain filtering with a width of only approximately 50 nm for this angle spectrum. Therefore, the prior art specifies a maximum angle of incidence for narrowband edge or bandpass filters, which may not be exceeded during the application.

In the prior art, the filter is realized with approximately plane layers in the entrance pupil. There can be a series expansion for the cosine function for small angles a of less than 20°.

$$\cos(\alpha \to 0) = 1 - \frac{\alpha^2}{2} + \ldots$$

According to certain embodiments of the invention, the filter element is arranged outside of the entrance pupil and can comprise, in particular, spherical filter layers, the centers of curvature of which are located in the optically defined entrance pupil in each case. To this end, the filter element can be configured as a transmissive element upstream of the entrance pupil (like in FIG. 16) or as a retroreflective element downstream of the entrance pupil (as in FIGS. 1 and 2). This arrangement ensures that all object chief rays which run through the center of the entrance pupil are transmitted by or incident on the filter layers in exactly perpendicular fashion. The object rays extending through the pupil field edges pass through the filter layers at a certain angle, however, and will thereby limit the narrow bandwidth property of the filter element. On account of maintaining the etendue in the spaced apart filter plane, the angle spectrum $\Delta\alpha_{Filter}$ is smaller than in the optical entrance pupil by exactly the factor of n. Since the cosine function scales with the square of the angle for small angles, it is possible in the new spaced apart filter position to attain filtering that is narrower than in the vicinity of the optical entrance pupil by the factor of $n^2$. The illustrated dependence can be understood to be a far field approximation, and so it is applicable above an n-factor of approximately 2. It is particularly preferred to use factors ranging from 2 to 20 because these can achieve a spectral resolution increase of 4 . . . 400-times. However, for extremely narrowband spectroscopic applications, the n-values can also achieve 100 and beyond.

The filter element can comprise curved filter layers in the optical system according to certain embodiments of the invention. In particular, the filter layers can have a spherical curvature. Preferably, the centers of curvature of the spherically curved filter layers coincide. Particularly preferably, the centers of curvature of the spherically curved filter layers are closer to the entrance pupil than to the filter element (e.g., the distance of the respective center of curvature from the entrance pupil can be less than 50%, 40%, 30%, 20%, 10%, 5%, 4%, 3%, 2% or 1% of the distance between filter layer and entrance pupil) and, in particular, the centers of curvature of the spherically curved filter layers are located in the entrance pupil.

In particular, the filter layers are arranged in succession in the direction from the entrance pupil to the filter element. Therefore, the filter element could also be said to be structured in the direction from the entrance pupil to the filter element or the filter element could be called an axially structured filter element.

By way of example, the filter layers can be dielectric layers, Bragg planes of a volume hologram and/or reflecting layers with a transparent spacer layer. If the filter layers are Bragg planes of a volume hologram, the substrate for the volume hologram can comprise virtually any geometric shape since the Bragg planes of the volume hologram are important for the optical effect.

It is understood that the features specified above and the features yet to be explained below can be used not only in the specified combinations, but also in other combinations or on their own, without departing from the scope of the present invention.

The invention will be explained in even more detail below on the basis of exemplary embodiments, with reference being made to the appended drawings, which likewise disclose features essential to the invention. These exemplary embodiments are only illustrative and should not be construed as restrictive. For example, a description of an exemplary embodiment with a multiplicity of elements or components should not be construed as meaning that all of these elements or components are necessary for implementation. Rather, other exemplary embodiments can also contain alternative elements and components, fewer elements or components, or additional elements or components. Elements or components of different exemplary embodiments can be combined with one another, unless stated otherwise. Modifications and variations which are described for one of the exemplary embodiments can also be applicable to other exemplary embodiments. In order to avoid repetition, the same elements or corresponding elements in different figures are denoted by the same reference signs and are not explained a number of times.

DETAILED DESCRIPTION

Figure 1:
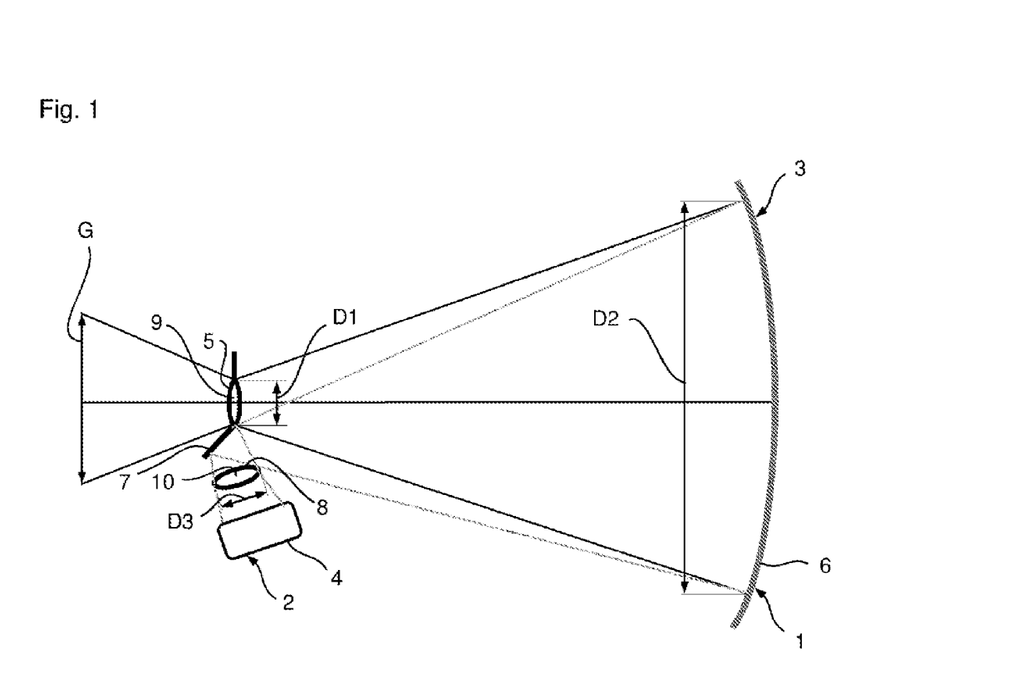
FIG. 1 shows a first exemplary embodiment of the optical system.

In the exemplary embodiment shown in FIG. 1, the optical system 1 according to certain embodiments of the invention comprises a camera 2.

The camera 2 comprises a camera optical unit 8 and a sensor 4 (or detector 4), wherein the camera optical unit 8, together with the imaging optical unit 3 of the optical system 1, images the object G onto the sensor 4.

The imaging optical unit 3 comprises a first partial optical unit 5, a reflective filter element 6 and a deflection mirror 7. The second partial optical unit 8 can also be part of the imaging optical unit 3.

The first partial optical unit 5 acts as an entrance stop or as an entrance pupil 9 with a first diameter D1. The rays of an image field of 40° pass through the entrance pupil 9, as illustrated schematically in FIG. 1, and then propagate divergently therefrom in the direction toward the filter element 6. The filter element 6 is arranged and designed such that the rays from the image field of 40° illuminate a region with a second diameter D2 on the filter element 6, said second diameter corresponding to n-times the first diameter D1. In the case of the image field of 40° assumed here and in the case of an acceptance angle of ±2° of the filter element 6, n is approximately 10. Consequently, the second diameter D2 is 10 times as large as the first diameter D1.

As indicated in FIG. 1, the filter element 6 can have a curved form. In particular, it can be spherically curved for example, wherein the radius of curvature can correspond to the distance from the first partial optical unit 5. However, the filter element 6 can also have a plane embodiment or any curved shape.

The filter element 6 realizes pupil imaging of the entrance pupil 9 on the exit pupil 10 and, at the same time, the narrow spectral filtering.

Since the etendue (=solid angle×cross section) is maintained, the local angle spectrum at each point of the surface of the filter element 6 is reduced in comparison to the entrance pupil 9 by a factor of n. Consequently, desired narrow spectral filtering can be realized by means of the filter element 6.

The conversion factor between spectral width and admissible angle range (acceptance angle) depends on the deflection angle of the rays at the filter element 6 (specifically on the cosine of half the deflection angle). If the deflection angle is 0°, an incident beam is reflected back on itself such that a desired filter width of 1 nm for radiation at 900 nm corresponds to an angle range of ±2.7°. On account of the series expansion of the cosine function, the obtainable spectral width reduces with the square of the illumination diameter ratio n.

By contrast, if an angle of incidence (deflection angle) of 20° were to be realized, for example, the admissible angle spectrum (=acceptance angle) would be 20°±0.08° for 1 nm filtering for 900 nm radiation. In this case, the filter bandwidth only reduces linearly with the illumination diameter ratio n.

For this reason, the structure as per FIG. 1 is preferred since this realizes a deflection angle of virtually 0°.

In particular, a third diameter D3 of the second partial optical unit 8 can correspond to the first diameter D1.

An optical unit which images rays reflected by the filter element 6 can be realized in this region in particular.

The deflection mirror 7 advantageously leads to being able to prevent an unwanted partition by the second partial optical unit 8. Naturally, it is possible to provide at least one deflection element (not illustrated) between the first partial optical unit 5 and the filter element 6 in order to improve the ability to build the camera 2.

The filter element 6 can be designed as a dichroic layer stack. In this case, it is preferable for the radius of curvature of the filter element 6 to correspond to the distance from the entrance pupil 9 such that all rays are incident into the filter structure in virtually perpendicular fashion.

The filter element 6 can also be formed from two reflection layers/layer stacks with a transparent spacer layer, in a manner similar to a curved Fabry-Perot filter.

By way of example, should the specified 1 nm filtering be carried out at 900 nm, it is necessary for approximately 900 partial waves to interfere in the filter 6, and so the filter thickness corresponds to approximately 0.5 mm. Since it is complicated to produce such thick filters 6, a transparent equally thick spacer layer can preferably be provided as a substrate between two significantly thinner layer stacks.

The reflective filter element 6 can particularly preferably be embodied as an optical volume hologram. The maximum refractive index jump of the structures in this grating should be chosen such that an effective ordinal grating number in the region of 1000 is obtained. If such volume hologram materials are used, the filter element 6 can have any curved or else plane embodiment.

The polymer materials used for volume holograms have linear coefficients of expansion in the region of $10^{-5}$/m. If the filter 6 is used in greatly varying ambient temperatures, the filter wavelength can be shifted in deterministic fashion. In this case, use should particularly preferably be made of a laser source which is adapted spectrally to the working point of the filter element 6, for example by way of temperature control, or the measurement values should be appropriately corrected in the case of spectroscopy applications.

If an additional optically imaging element is arranged in the entrance pupil 9 or upstream or downstream of the entrance pupil 9 (such as a lens or an imaging mirror, for example), a real intermediate image can be imaged onto the filter element 6 or into the vicinity of the filter element 6. In particular, the vicinity of the filter element 6 is understood to mean that the distance of the imaged real intermediate image to the filter element 6 is less than the distance to the entrance pupil 9. Then, it is advantageous if the curvature of the filter element 6 is adapted to the field curvature of the first partial optical unit 5 and the second partial optical unit 8.

Downstream of its filter layer, the filter element 6 can comprise a refractive index-adapted layer made of a strongly absorbent material in order to absorb transmission light and scattered light which passes through the filter 6 and hence suppress this from detection by the sensor 4.

The second partial optical unit 8 can be embodied as a camera lens according to the prior art. In particular, the second partial optical unit 8 is optimized in such a way that it realizes an image field that is as sharp and flat as possible together with the imaging performance of the filter element 6 and the optional first partial optical unit 5. On account of the very narrow band longitudinal wavelength range reflected by the filter element 6, hybrid or diffractive optical units are also suitable for the first and/or second partial optical unit 5, 8.

Figure 2:
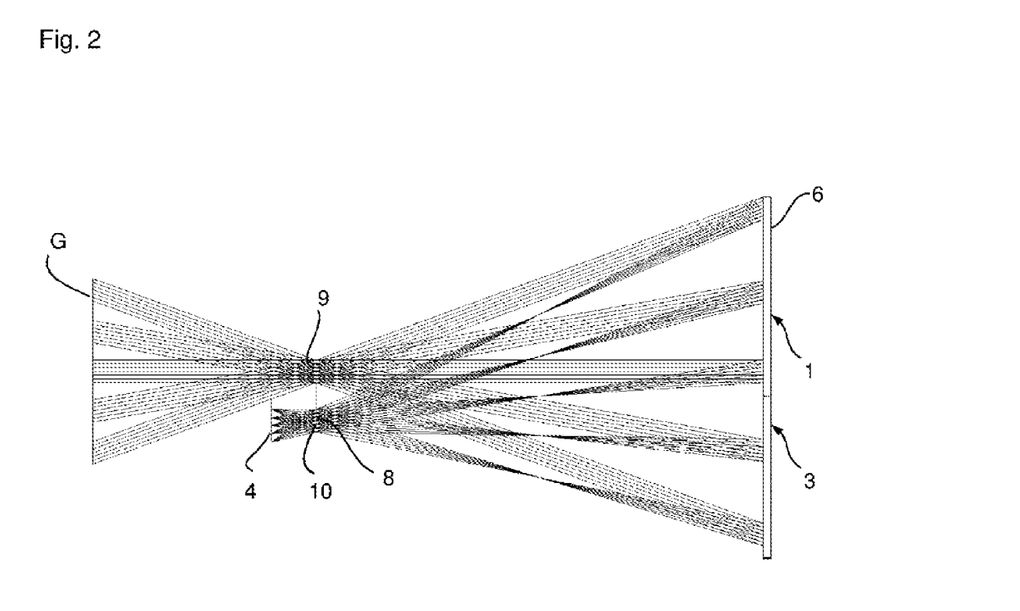
FIG. 2 shows a further exemplary embodiment of the optical system.

FIG. 2 shows an exemplary embodiment without a first partial optical unit 5 in the entrance pupil 9. The second partial optical unit 8 is plotted schematically.

It is possible to identify that the optical system 1 according to the invention facilitates a large image field with a large aperture/luminous intensity, but a very narrowband detection and hence good ambient light suppression is nevertheless obtained as a result of the arrangement of the filter element 6.

A disadvantage of the embodiment as per FIG. 2 are the imaging aberrations as a result of the imaging effect of the filter element 6, which realizes pupil imaging. For this reason, the exemplary embodiment as per FIG. 2 is a design which is very simple to realize but which may have limits in terms of image sharpness.

Figure 3:
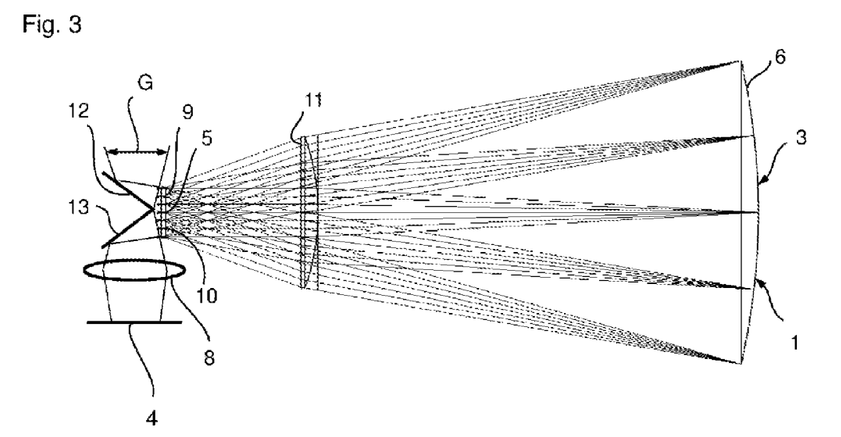
FIG. 3 shows a further exemplary embodiment of the optical system.

A development of the exemplary embodiment of FIG. 2 with improved image performance is illustrated in FIG. 3. In this exemplary embodiment, the first partial optical unit 5 is formed as an asphere and a third partial optical unit 11 (which is likewise a part of the imaging optical unit 3) is additionally arranged between the first partial optical unit 5 and the filter element 6, said third partial optical unit ensuring that an intermediate image is imaged on the filter element 6. By way of example, the third partial optical unit 11 can be formed as a planoconvex lens 11. The third partial optical unit 11 can prevent imaging aberrations caused by the imaging filter element 6. In the exemplary embodiment shown in FIG. 3, the planoconvex lens 11 is arranged symmetrically in the outward path to the filter element 6 and symmetrically in the return path from the filter element 6. This realizes a comparatively simple optical arrangement made of a weakly aspherical lens 5 in the entrance pupil 9 and a second lens 11 (planoconvex lens 11), by means of which a diffraction-limited performance can be realized, for example for pupil dimensions in the region of 20 mm and field angles of 40°. Since the imaging filter element 6 is used in retroreflection, the division between entrance pupil 9 and exit pupil 10 can be realized by way of a pupil split. Two deflection mirrors 12 and 13 are provided to this end.

Figure 4:
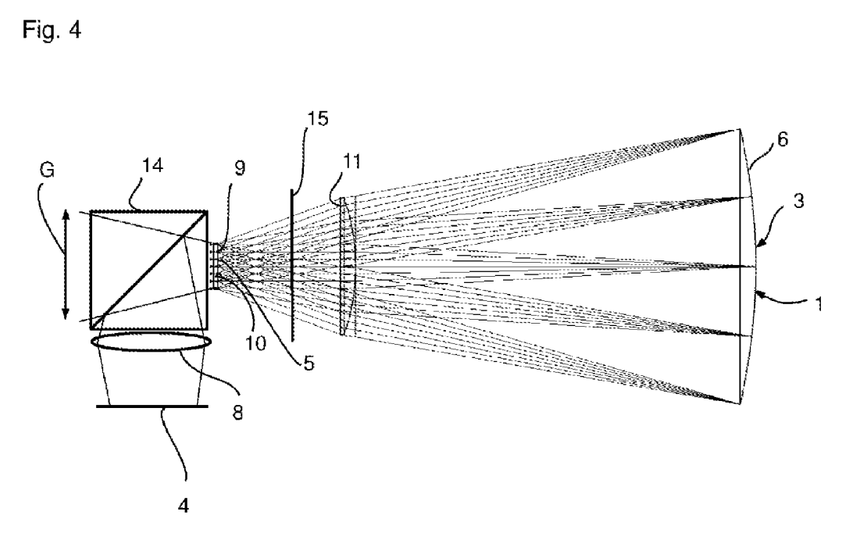
FIG. 4 shows a further exemplary embodiment of the optical system.

Alternatively, a polarization split can be carried out, as illustrated in FIG. 4. The desired polarization split is realized by the polarization splitter cube 14 and the downstream quarter-wave plate 15. Naturally, it is also possible to implement an intensity split. In this case, an appropriate beam splitter cube is provided in place of the polarization splitter cube 14. Then, the quarter-wave plate 15 may be dispensed with.

If a polarization split or intensity split is carried out, it is preferable for the exit pupil 10 to be imaged exactly on the entrance pupil 9 in order to optimize the image quality. The split can also be realized by a splitter plate instead of a splitter cube. To improve the correction of the imaging optical unit 3, it may be advantageous to implement the pupil position in inaccessible fashion within the imaging optical unit 3. For this case especially, a polarization or intensity split is preferred since this can be implemented not only in the pupil but also on the path between entrance pupil 9 and filter element 6, as is the case, for example, in the exemplary embodiments as per FIGS. 10 to 13 yet to be described below.

Figure 5:
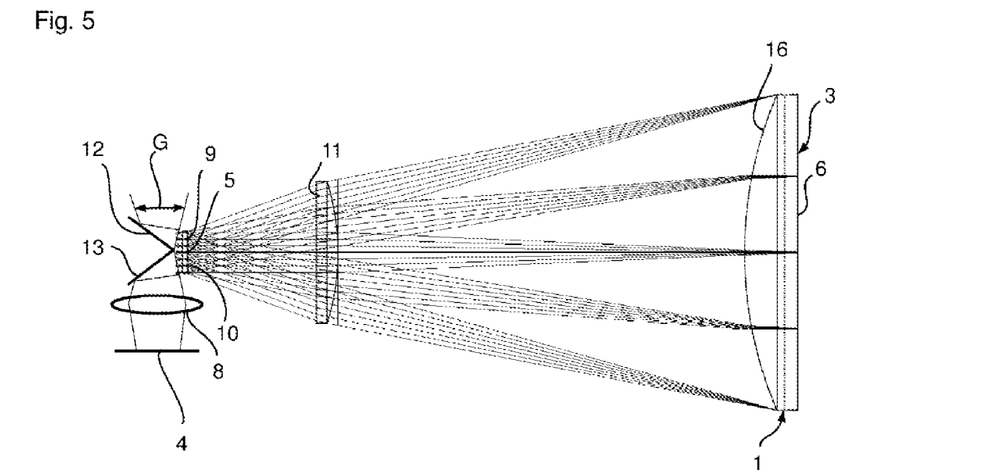
FIG. 5 shows a further exemplary embodiment of the optical system.

For technological reasons it may be advantageous to design the filter element 6 as a plane component. A desired field plane planarization, for example, can be realized by way of an additional field lens 16 (which is likewise part of the imaging optical unit 3), as shown schematically in FIG. 5. In this case, the exemplary embodiment as per FIG. 5 is a development of the exemplary embodiment as per FIG. 3.

Alternatively, the aspherical lens 5, the planoconvex lens 11 and the field lens 16 can be replaced by an appropriately designed diffractive optical lens 17, which carries out the desired field planarization. By way of example, this may be advantageous especially if the structure should be used in applications where installation space is very critical. Here, this could be smartphones, for example, the overall thickness of which should be no greater than for example 7 mm. In this case, the image field on the filter element 6 can be folded by additional mirror elements 18, 19, as illustrated schematically in FIG. 6. For the filter element 6, a plurality of grating arrangements for different reflecting image field components can be exposed in nested fashion in a volume hologram in this case. Instead of the pupil division with the two deflection mirrors 12, 13, a polarization splitter cube 14 is used in this case.

Figure 6:
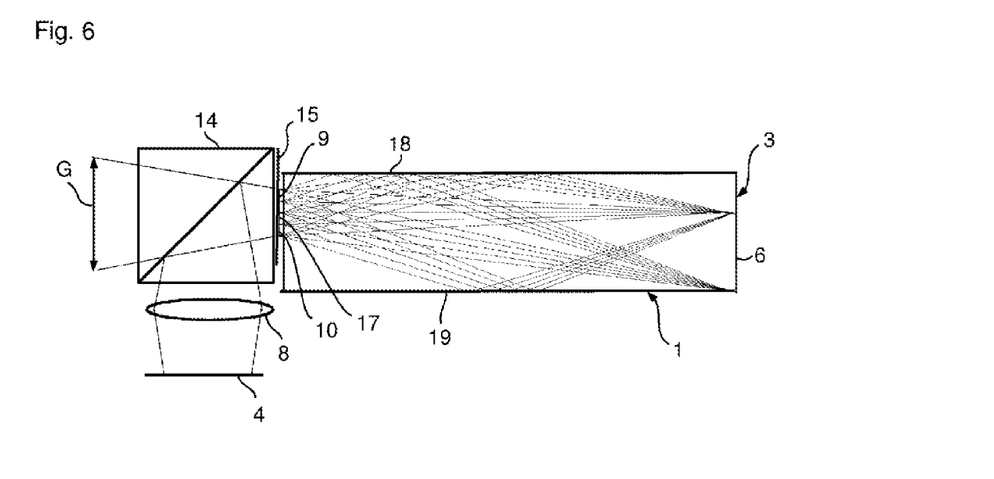
FIG. 6 shows a further exemplary embodiment of the optical system.
Figure 7:
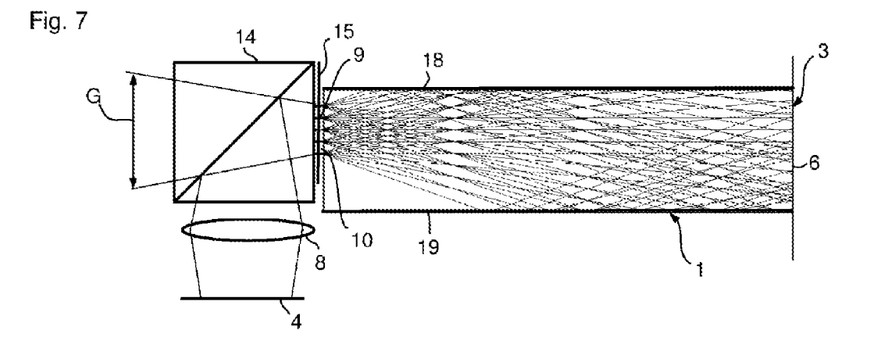
FIG. 7 shows a further exemplary embodiment of the optical system.

FIG. 7 shows a modification of the optical system 1 as per FIG. 6 in which the diffractive optical lens 17 is no longer provided, as a result of which no intermediate image is generated on the filter element 6 anymore. The mixing rod formed by the two mirror elements 18, 19 is arranged off center in the same way as in the exemplary embodiment as per FIG. 6, as a result of which the symmetry is broken, and ghost images caused by the filter element 6 can be prevented.

Figure 8:
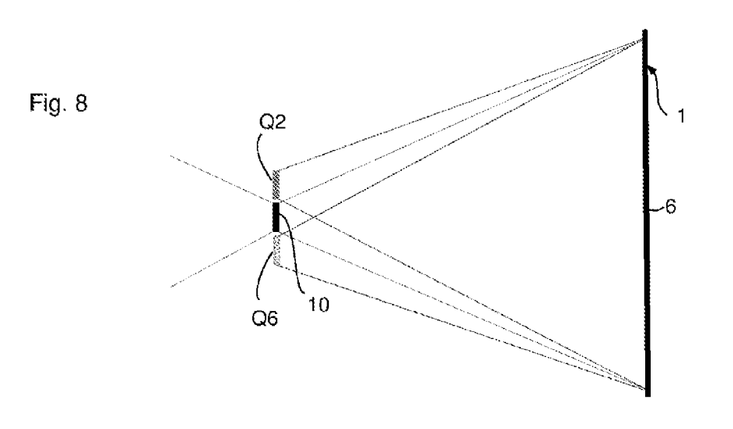
FIG. 8 shows a further exemplary embodiment of the optical system.
Figure 9:
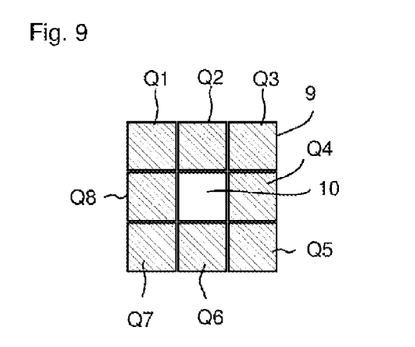
FIG. 9 shows a plan view of the arrangement of entrance and exit pupil in FIG. 8.

The optical system 1 according to the invention can also be realized as a narrowband source filter, as illustrated schematically in FIGS. 8 and 9. In this case, eight sources Q1-Q8 are arranged in exemplary fashion in an entrance pupil 9 that surrounds the exit pupil 10. The light from these sources Q1-Q8 is reflected in filtered fashion by the reflective filter element 6 and imaged into the exit pupil 10. The illustrated sources Q1-Q8 can be real sources, such as LEDs for example, or else images of such sources.

The spatial arrangement of entrance and exit pupil 9, 10 illustrated in FIGS. 8 and 9 should be understood to be purely exemplary. The entrance pupil 9 need not surround the exit pupil 10 but can be arranged next to the exit pupil 10, for example. What is essential is that a very narrowband illumination with light passing through the exit pupil 10 is rendered possible in this way. By way of example, the individual sources Q1-Q8 can be turned on and off in succession or in selective fashion (i.e., not only be spectrally filtered in narrowband fashion but also be mirrored together in a technically simple manner).

The optical system 1 according to the invention can also be designed as a spectrometer. By way of example, if use is made of an optical construction as per FIG. 3 and a holographic volume grating as a filter element 6, the Bragg planes in the grating extend on spherical surfaces that are perpendicular to the incident chief rays. Should the filter element work for wavelengths in the near infrared (e.g., 900 nm), the Bragg planes must have a spacing of approximately 450 nm/$n_1$ ($n_1$=the mean refractive index of the material for the holographic volume grating, a value of approximately 1.52). However, typical holographic materials, as are available from, e.g., Akonia Holographics or Covestro, can only be written in the visible spectral range. With these writing wavelengths of, e.g., 500 nm it is difficult to write spherical Bragg planes with a spacing of 450 nm/$n_1$.

It is therefore preferable to write the holographic volume grating using an auxiliary hologram, which significantly simplifies the exposure construction and allows flexible local writing geometries.

Applied to the reflective filter element 6 with the spherically curved Bragg planes to be written in this case, it is then possible to write gratings with any relatively long used wavelength using one writing wavelength. Since, moreover, a real intermediate image is present on the filter element 6 as a result of the optical construction as per FIG. 3, different used wavelengths can be written for each camera pixel of the sensor 4 hence it is possible, for example, to realize a 1-D spectrally resolved camera image.

It is also possible to write more flexible structures, as are used for hyperspectral imaging. To this end, for example 16 camera pixels of the sensor 4 with different used wavelengths are interconnected to form an image sensor element with 16 spectral bands, and hence it is possible to realize a 2-D resolved camera image with 16 spectral sampling points without a mechanical beam deflection apparatus.

Since the auxiliary hologram can particularly preferably also be configured as a volume hologram, it is also possible to write a plurality of volume gratings with a different Bragg plane density to each point, as a result of which the reflective filter element 6 can be realized as a multiband filter.

By way of example, should a narrow spectral absorption line be detected in a camera image, each second pixel can detect the sum from each 1 nm range above and below the absorption band and the second pixel can detect a 2 nm range on the absorption line. The difference signal from these two pixels then represents a level of absorption on the spectral line from which the background absorption has been removed.

By way of example, if multiband filters are written according to Hadamard sequences for certain camera line regions, it is possible to realize a very fast Hadamard spectrometer in a technically simple fashion. That is to say time multiplexing of various switching states of the Hadamard mask is replaced in one dimension by the simultaneous capture of various line-by-line codes. Alternatively, an array of switchable holograms can be used in the filter plane of the filter element 6 in order to realize a dynamic mask. This allows the realization of low cost spectrometers, particularly in combination with FLIR microbolometer arrays. The significantly lower sensitivity of the microbolometer arrays when detecting light between 400 nm and 2000 nm in comparison with silicon or indium gallium arsenide sensors can be compensated by the significantly higher luminous intensity from Hadamard spectroscopy.

The materials from Covestro are suitable for all applications in spectral regions where they are transparent, for example from 400 to 2000 nm.

Moreover, there is a possible alternative in the development of index-modulable glasses. These inorganic materials promise greater temperature stability, and chemical and mechanical stability. However, the maximum refractive index differences that can be induced in these glasses currently still are smaller than for the polymer materials. However, since significantly lower refractive index differences are sufficient for the application described here, such writable glasses are an option for realizing the reflective filter element 6.

In addition to Hadamard spectrometers, FTIR spectrometers can also be realized by the illustrated teaching according to the invention. If the volume grating is considered locally, the incident light source is reflected back at the Bragg structures. Each Bragg plane generates a back-reflected field strength component with a certain phase angle. The full field strength vector reflected back at one point of the filter element 6 emerges as the integral of the back-scattered field strength vectors with their relative phase angles over all depths of the filter element 6. The spectral distribution of the back-scattered light components then emerges as Fourier transform of the refractive index distribution over the various depths of the filter element. If the refractive index has a sinusoidal modulation over the depth, exactly one wavelength is reflected back. The number of modulation periods or the mathematical window function of the overall thickness of the filter element 6 then determines the frequency bandwidth of the back-scattered radiation.

Fourier sequences, as are technically implemented in Fourier Transform IR spectrometers in spectroscopy, form a very similar approach to the Hadamard sequences. If the depth function of the filter element 6 corresponds to two thin partly reflecting faces at a certain distance from one another, this yields a broadband distribution with sinusoidal modulated spectral intensity as a spectrum of the back-reflected waves. The period of this modulation is proportional to the distance between the two partly reflecting faces. As a result, it is possible to realize FTIR spectroscopy without moving parts by way of a structure realized according to FIG. 10.

Figure 10:
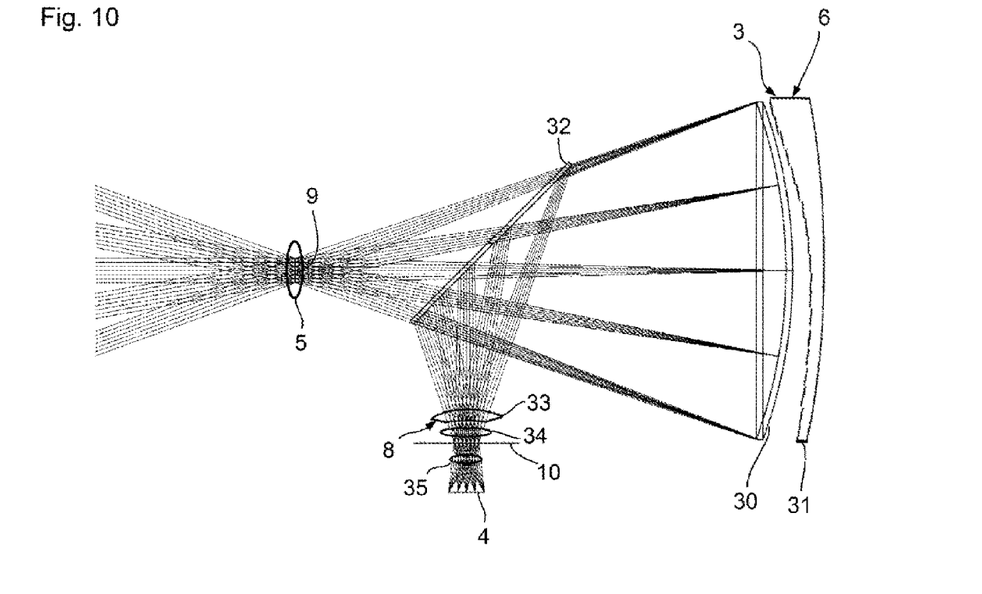
FIG. 10 shows a further exemplary embodiment of the optical system.

In the embodiment as per FIG. 10, the filter element 6 is designed as a double reflector with a partly reflective curved element 30 and a stepped mirror 31 arranged at a distance therefrom, with the illustration of the elements 30 and 31 in FIG. 10 being very exaggerated and not true to scale so as to be able to represent the stepped mirror 31. A beam splitter plate 32 for an intensity or polarization split is provided on the path between the entrance pupil 9 and the filter element 6. In this case, the second partial optical unit 8 has three lenses 33, 34 and 35 and the exit pupil 10 is located between the lenses 34 and 35 in the exemplary embodiment shown in FIG. 10.

In the basic design shown in FIG. 10, the first partial optical unit 5 is arranged in the entrance pupil 9 in order to generate an intermediate image on the filter element 6. However, the first partial optical unit 5 can also be dispensed with if the generation of the intermediate image on the filter element 6 is not desired. Further, the basic design as per FIG. 10 can be varied, for example by additional lenses upstream and/or downstream of the entrance pupil 9 (the first partial optical unit 5 can for example be dispensed with in this case), in order either to generate an intermediate image on the filter element 6, if a spatially resolved and spectrally resolved arrangement is sought after, or to homogenize the object field. In addition to the arrangement of the two elements 30 and 31 as shown in FIG. 10, which leads to one arm, the two elements 30 and 31 can be arranged in two different arms as illustrated schematically in FIGS. 12 and 13.

The retardation path can be defined individually for each detector pixel. At the same time, the pupil imaging of the filter element 6 must be maintained in undisturbed fashion. If only very small differences should be realized between the retardation length of adjacent pixels, the two reflecting planes can be arranged with a slight tilt relative to one another, thus varying the retardation path linearly over the image field. However, if relatively significant gradients of the retardation path should be realized it is necessary for at least one of the two reflecting elements to be realized in stepped fashion so as not to allow the pupil imaging quality to deteriorate at the same time. Locally for a pixel, the two faces have a spherically curved shape with a center of curvature in the center of the pupil. If both reflecting faces are realized in stepped fashion, the macroscopic arching of the filter element can be better adapted to the field curvature of the subsequent optical unit.

In the spectrometer illustrated in FIG. 10, each camera pixel sees approximately two-beam interference with a specific retardation path. To record a spectrally resolved image of the surroundings, the spectrometer needs to be scanned over the object in the second direction in order also to achieve the spatial resolution (and the latter in spectrally resolved fashion) also in the second direction. By way of example, this can be achieved by an additional mechanical scanning device (not illustrated). In the case of airborne imaging spectrometers, the scan can be realized by the airborne motion of the spectrometer.

Figure 11:
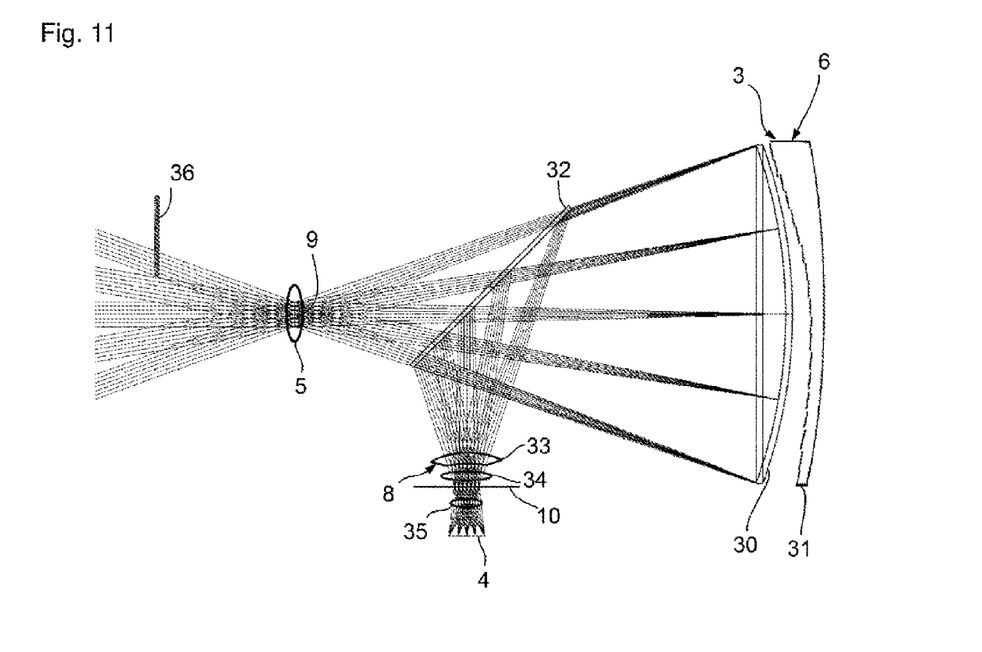
FIG. 11 shows a further exemplary embodiment of the optical system.

If this spectrometer is used to record spectral images over a relatively large measurement distance with passive solar illumination, a solar reference spectrum can be recorded simultaneously at the image edge by way of a white diffusing plate 36 (see FIG. 11).

The back-scattering characteristic of the filter element 6 shown in FIGS. 10 and 11 does not exactly correspond to a two-beam interference but rather to a multi-beam interference of a Fabry-Perot interferometer with a very low quality factor. However, this characteristic can be taken into account and compensated for during the evaluation. The front element 30 (e.g., a meniscus lens 30), which is partly mirrored on the back side, also has a front-side reflection which influences the overall spectral characteristic. However, if the meniscus lens 30 is significantly thicker than the maximum gap width to the second stepped element 31 (or to the stepped mirror 31), the very fast spectral modulations caused thereby cannot be resolved and therefore be corrected by offset subtraction.

Figure 12:
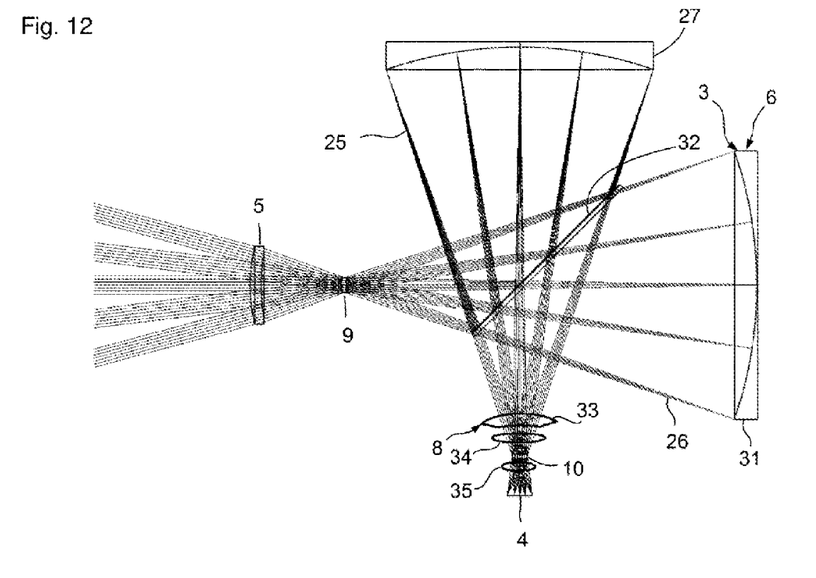
FIG. 12 shows a further exemplary embodiment of the optical system.

Alternatively, use can also be made of a variant of the structure as shown in FIG. 12. In this variant, the beam splitter plate 32, which can implement an intensity split or a polarization split, is utilized such that two split interferometer arms 25, 26 are generated. Instead of the meniscus lens 30, a spherical mirror 27 is arranged in the first interferometer arm 25. The stepped mirror 31 (illustrated schematically) is provided in the second interferometer arm 26. In this case, too, the spherical mirror 27 and the stepped mirror 31 form the filter element 6. Naturally, the arms 25, 26 can also be arranged in interchanged fashion. Further, it is possible for both elements 27 and 31 to be embodied as a stepped mirror in each case.

The stepped mirror or the stepped element 31 is preferably mirrored over the whole front side so that it can be manufactured from any desired materials such as metals, plastics or glass. The same applies to the spherical mirror 27.

A polarizing beam splitter and an optical retarder plate with a retardation of λ/4 are required for the realization of a polarization split. To realize a very broadband spectrometer up to wavelengths in the mid-infrared range of up to 16 µm, it is possible to use broadband-polarizing coatings with wire grid coatings, as are known from the prior art. However, there are no broadband retarder plates above a wavelength of 2 µm, and so an intensity split is preferred for the spectrometer arrangements in particular. Such an intensity split with mirrored-apart arms as illustrated in FIG. 12 then has the advantage of double efficiency and a more easily evaluable undisturbed two-beam interference.

Since no volume hologram polymer with a restricted IR transmission is used as a filter element 6, but only an optically effective air gap, the usable spectral range can be extended from the UV range (ultraviolet range) to the MIR (mid-infrared) in the case of a suitable choice of the optical materials of the remaining components.

The basic principle of being able to realize a high spectral resolution with at the same time a very sensitive camera optical unit with a large f-number of less than 1.5 and a very sensitive spectrometer principle such as FTIR, which can register approximately half of the entire incident spectral brightness with each sensor element, also facilitates sensor elements with a lower sensitivity. By way of example, it is possible to use microbolometers as a detector and hence utilize a spectral range from 600 nm to approximately 16 µm if the transmissive optical elements have a corresponding transmission (e.g., are manufactured from zinc selenite).

Figure 13:
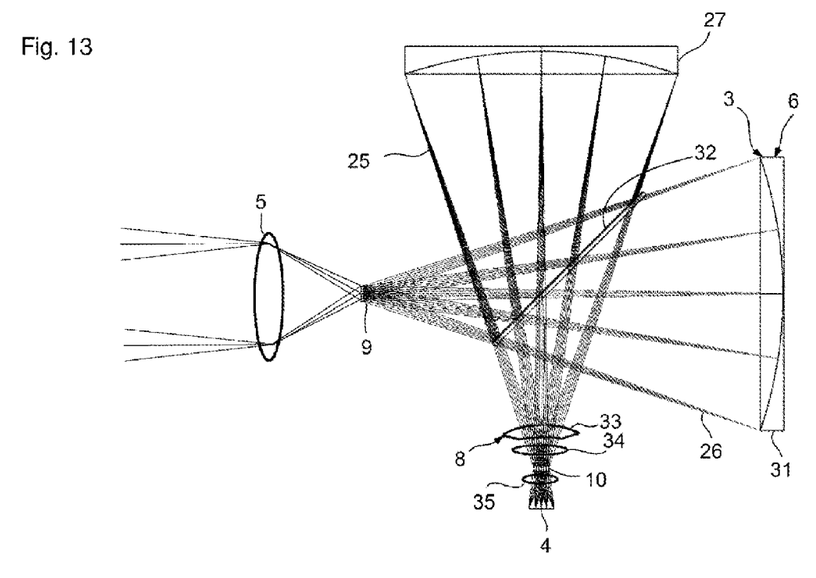
FIG. 13 shows a further exemplary embodiment of the optical system.

If a low cost IR spectrometer without spatial resolution should be realized, which records a spectrum with an image, the structure as per FIG. 13 is preferred. The structure as per FIG. 13 is optimized for the use of two-dimensionally spatially resolving sensors with a restricted pixel resolution. The light incident from the surroundings can be homogenized at least over the angle spectrum by way of an illumination by means of a lens 5 (upstream of the entrance pupil 9 in the object space in this case) that has been as it were rendered to be Kohler-type, and which virtually acts as what is known as a "Kohler lens", as shown in FIG. 13. Also, any other type of homogenization by means of an optical unit, for example by means of a double lens array (e.g., in the field and aperture) (not illustrated), is also possible. These types of homogenization are known to a person skilled in the art.

The schematically illustrated stepped mirror 31 is stepped in the direction from top to bottom in the illustration and is tilted in the direction perpendicular to the plane of the drawing such that a wedge-shaped air gap arises in this direction. The wedge properties are preferably set such that the gap width on the image field edge approximately corresponds to the step height in the second direction such that the path length difference is distributed in two-dimensional fashion over the detector 4.

In the optical systems described previously, the filter element 6 was always a reflective filter element 6. However, it is equally possible to design the filter element 6 as a transmissive filter element 6.

Figure 14:
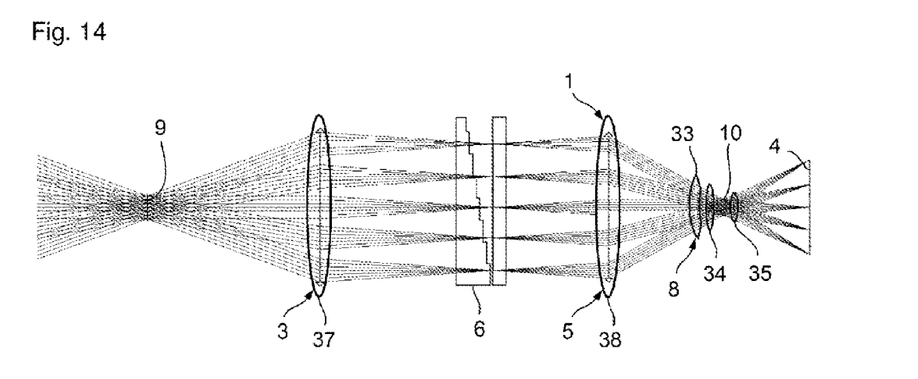
FIG. 14 shows a further exemplary embodiment of the optical system.
Figure 15:
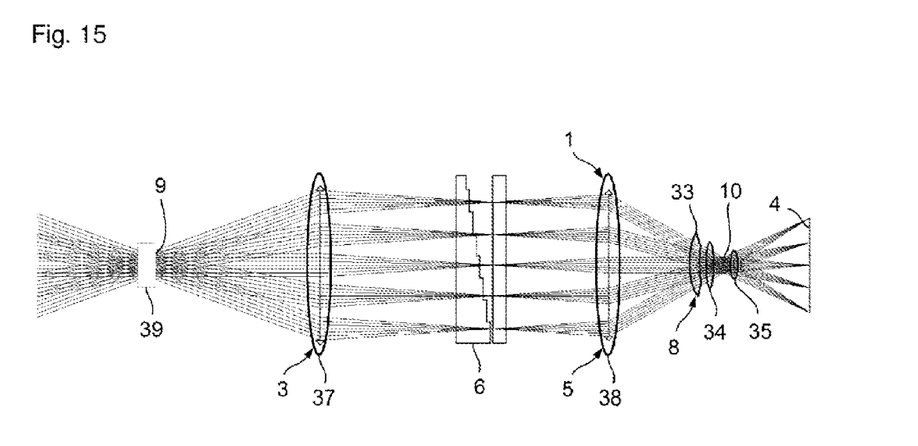
FIG. 15 shows a further exemplary embodiment of the optical system.

An exemplary embodiment of such an optical system 1 with a transmissive filter element 6 is shown in FIG. 14, in which case the first partial optical unit 5 with the schematically illustrated converging lenses 37 and 38 between the entrance pupil 9 and exit pupil 10 is designed such that the divergently propagating beam passing through the entrance pupil 9 is rendered parallel by the converging lens 37 and is imaged onto the filter element 6 such that a spatially resolved and spectrally resolved spectrometer arrangement can be realized. After passing through the transmissive filter element 6, the beam is focused and passes through the second partial optical unit 8 including the exit pupil 10, and then strikes the detector 4.

On account of the described embodiment of the first partial optical unit 5, the retardation path in the Fabry-Perot filter element 6 can be defined individually for each detector pixel.

The spectrometer arrangement or the spectrometer as per FIG. 14 can therefore also be referred to as a transmissive filter variant to the spectrometer as per FIG. 10.

If a spatial resolution of the spectrometer as per FIG. 14 is not demanded or desired, an optical homogenization element 39 can be positioned in the region of the entrance pupil 9 for example, as a result of which a purely spectrally resolving spectrometer in transmission with a transmissive filter element 6 is provided.

Figure 16:
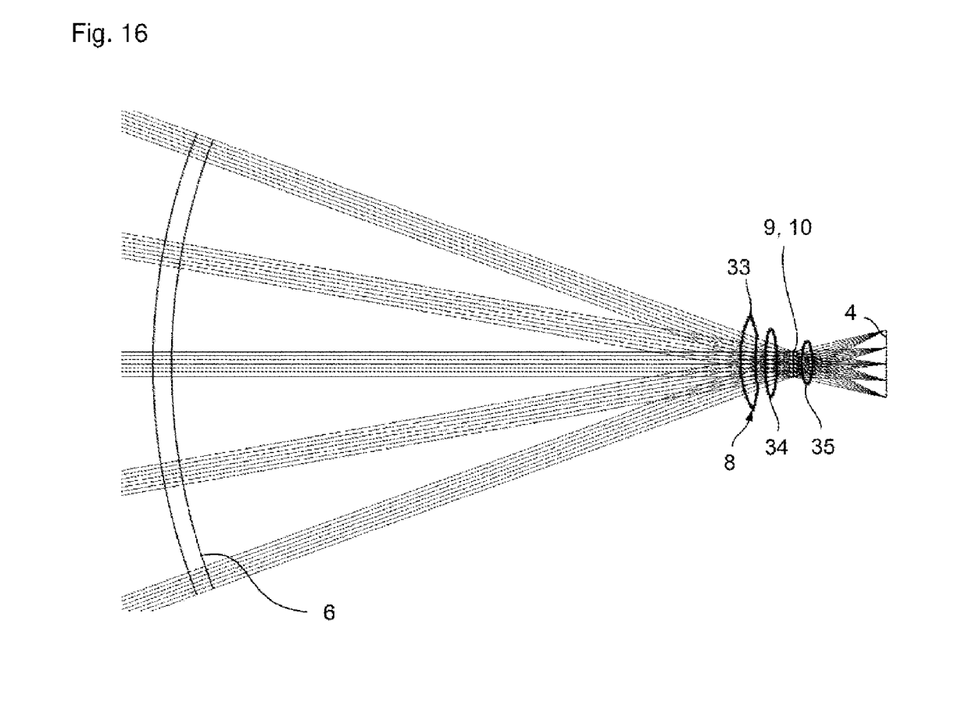
FIG. 16 shows a further exemplary embodiment of the optical system.

FIG. 16 shows a further exemplary embodiment of the optical system 1 according to the invention, in the case of which a transmissive filter element 6 is provided. In the exemplary embodiment as per FIG. 16 there is a complete overlap of entrance pupil 9 and exit pupil 10 (they are congruent in the exemplary embodiment described here), with the entrance pupil 9 being a virtual entrance pupil.

The transmissive filter element 6 is embodied in curved fashion here (preferably with spherical curvature) and filters in transmission. By way of example, the transmissive filter element 6 can be realized as a metal interference filter. To this end, thin metal layers (for example with a thickness of 1 µm or less, for example with a thickness ranging from 10 to 200 nm) can be provided in alternating fashion with dichroic spacer layers. By way of example, silver layers can be used if such a transmissive filter should be provided for the visible spectral range. If gold layers are used, it is particularly preferred for the transmissive filter element 6 to be designed for the infrared range or the near infrared spectral range.

Hybrid filters with metal interference layers may also be provided. Purely dichroically coated filter elements 6 may also be provided.

The transmissive filter element 6 can also be designed as a volume hologram or contain at least one volume hologram layer. These can be the same as or similar to the volume hologram embodiments of the reflective filter element 6. In particular, it is possible to provide a different curvature for the transmissive filter element 6 than a spherical curvature of the transmissive filter element 6, which is preferably present in relation to the entrance pupil 9 and/or the exit pupil 10. The transmissive filter element 6 can also have a planar embodiment.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An optical system, comprising:
   an entrance pupil with a first opening diameter,
   an exit pupil; and
   a reflective filter element that reflects radiation only in a predetermined spectral range, which is spaced apart from the entrance pupil and which is designed and arranged such that a second diameter is illuminated on the filter element by a beam which passes through the entrance pupil and propagates divergently from the latter,
   wherein the second diameter corresponds to n-times the first opening diameter, where n is a number greater than one, as a result of which the local angle spectrum at each point of the filter element is n-times smaller in comparison with the entrance pupil,
   wherein the filter element at each point selectively reflects only the predetermined spectral range of radiation to the exit pupil, and
   wherein an imaging optical unit which comprises the filter element and which images the entrance pupil on the exit pupil is provided.

2. The optical system of claim 1, wherein the filter element is structured in the direction from the entrance pupil to the filter element.

3. The optical system of claim 2, wherein the filter element comprises successively arranged and in each case curved filter layers in the direction from the entrance pupil to the filter element.

4. The optical system of claim 3, wherein the filter layers are spherically curved, and their centers of curvature are located closer to the entrance pupil than to the filter element in each case.

5. The optical system of claim 4, wherein the centers of curvature of the filter layers coincide and are located in the entrance pupil.

6. The optical system of claim 1, wherein the imaging optical unit consists of the filter element or consists of the filter element and one or more deflection mirrors.

7. The optical system of claim 1, wherein the entrance pupil and the exit pupil at least partly overlap.

8. The optical system of claim 7, wherein the at least partial overlap is provided by an intensity and/or polarization splitter.

9. The optical system of claim 8, wherein the intensity and/or polarization splitter is arranged such that neither the entrance pupil nor the exit pupil extends through the intensity and/or polarization splitter.

10. The optical system of claim 1, wherein a plurality of entrance pupils are provided, wherein the plurality of entrance pupils are imaged onto the exit pupil via the filter element.

11. The optical system of claim 1, wherein the filter element comprises a volume grating, a dichroic layer stack and/or reflecting layers with a transparent spacer layer.

12. The optical system of claim 1, wherein the reflective filter element comprises a plurality of gratings for different image field components to be reflected or to be transmitted, exposed in nested fashion in a volume hologram.

13. The optical system of claim 12, wherein the reflective filter element comprises a volume hologram with a plurality of spherically curved Bragg planes.

14. The optical system of claim 12, wherein the reflective filter element comprises a plurality of switchable holograms.

15. The optical system of claim 1, wherein an extended light source or a real image of an extended light source is located in the entrance pupil.

16. The optical system of claim 1, wherein at least one mirror element for folding the beam path is arranged between the entrance pupil and the exit pupil.

17. The optical system of claim 1, wherein the imaging optical unit comprises at least one additional optical element upstream of the filter element for generating a real intermediate image of an object upstream of or on the filter element.

18. The optical system of claim 1, wherein at least one additional optical element is arranged upstream of the filter element in order to bring about a complete or partial homogenization in terms of field and/or aperture.

19. The optical system of claim 1, configured as a camera or a hyperspectral camera.

20. The optical system of claim 1, configured as a spectrometer or a switchable light source.

* * * * *